United States Patent
Emigh et al.

(10) Patent No.: US 7,818,317 B1
(45) Date of Patent: Oct. 19, 2010

(54) LOCATION-BASED TASKS

(75) Inventors: Aaron T. Emigh, Incline Village, NV (US); James A. Roskind, Redwood City, CA (US)

(73) Assignee: James Roskind, Redwood City, CA (US)

( * ) Notice: Subject to any disclaimer, the term of this patent is extended or adjusted under 35 U.S.C. 154(b) by 1412 days.

(21) Appl. No.: 10/938,198

(22) Filed: Sep. 9, 2004

Related U.S. Application Data

(60) Provisional application No. 60/501,691, filed on Sep. 9, 2003.

(51) Int. Cl.
   G06F 7/00 (2006.01)
   G06F 17/30 (2006.01)
   H04M 11/04 (2006.01)

(52) U.S. Cl. .................. 707/724; 709/230; 455/456.1

(58) Field of Classification Search .................. 707/102; 709/230; 455/422.1, 456.1
See application file for complete search history.

(56) References Cited

U.S. PATENT DOCUMENTS

| | | | |
|---|---|---|---|
| 5,661,473 A | 8/1997 | Paschal | |
| 5,801,618 A | 9/1998 | Jenkins | |
| 6,081,206 A | 6/2000 | Kielland | |
| 6,091,956 A | 7/2000 | Hollenberg | |
| 6,122,572 A | 9/2000 | Yavnai | |
| 6,192,360 B1 * | 2/2001 | Dumais et al. | 707/6 |
| 6,198,431 B1 | 3/2001 | Gibson | |
| 6,278,966 B1 | 8/2001 | Howard et al. | |
| 6,456,938 B1 | 9/2002 | Barnard | |
| 6,680,675 B1 * | 1/2004 | Suzuki | 340/988 |
| 6,778,905 B2 | 8/2004 | Horikami | |
| 6,834,195 B2 | 12/2004 | Brandenberg et al. | |
| 6,848,104 B1 * | 1/2005 | Van Ee et al. | 719/310 |
| 6,922,703 B1 | 7/2005 | Snyder et al. | |
| 7,023,818 B1 | 4/2006 | Elliott | |
| 7,046,841 B1 | 5/2006 | Dow et al. | |
| 7,069,238 B2 * | 6/2006 | I'Anson et al. | 705/26 |
| 7,107,179 B2 | 9/2006 | Malchi et al. | |
| 7,330,112 B1 | 2/2008 | Emigh et al. | |
| 7,451,059 B2 | 11/2008 | Malchi et al. | |
| 2002/0054130 A1 * | 5/2002 | Abbott et al. | 345/783 |
| 2002/0067308 A1 * | 6/2002 | Robertson | 342/357.17 |
| 2002/0089532 A1 | 7/2002 | Cohen et al. | |
| 2002/0111172 A1 | 8/2002 | DeWolf et al. | |
| 2003/0063072 A1 | 4/2003 | Brandenberg et al. | |
| 2003/0069940 A1 | 4/2003 | Kavacheri et al. | |
| 2003/0156750 A1 | 8/2003 | Dajee et al. | |
| 2004/0007121 A1 | 1/2004 | Graves et al. | |
| 2004/0010539 A1 * | 1/2004 | Archbold | 709/201 |
| 2004/0023666 A1 | 2/2004 | Moon et al. | |
| 2004/0032393 A1 | 2/2004 | Brandenberg et al. | |
| 2004/0043775 A1 * | 3/2004 | Kennedy et al. | 455/456.2 |

(Continued)

OTHER PUBLICATIONS

Kanth et al. "Personalization and location-based technologies for E-Commerce applications", Jan. 2002, vol. I, Issue http://www.ejeta.org/first-issue.php.*

(Continued)

*Primary Examiner*—Apu M Mofiz
*Assistant Examiner*—Cindy Nguyen
(74) *Attorney, Agent, or Firm*—Mahamedi Paradice Kreisman LLP

(57) ABSTRACT

In some embodiments, techniques for computer security comprise reducing the deceptiveness of electronic communications.

18 Claims, 9 Drawing Sheets

U.S. PATENT DOCUMENTS

| | | | |
|---|---|---|---|
| 2004/0098464 A1 | 5/2004 | Koch et al. | |
| 2004/0176107 A1* | 9/2004 | Chadha | 455/456.5 |
| 2004/0203847 A1* | 10/2004 | Knauerhase et al. | 455/456.1 |
| 2004/0210757 A1 | 10/2004 | Kogan et al. | |
| 2004/0230685 A1* | 11/2004 | Seligmann | 709/228 |
| 2005/0066044 A1* | 3/2005 | Chaskar et al. | 709/230 |
| 2005/0273254 A1 | 12/2005 | Malchi et al. | |
| 2006/0095171 A1 | 5/2006 | Whittaker et al. | |
| 2007/0010965 A1 | 1/2007 | Malchi et al. | |
| 2007/0150125 A1 | 6/2007 | Aspen | |
| 2007/0168122 A1 | 7/2007 | Aspen | |
| 2007/0244633 A1 | 10/2007 | Phillips et al. | |
| 2008/0167771 A1 | 7/2008 | Whittaker et al. | |
| 2008/0186164 A1 | 8/2008 | Emigh et al. | |
| 2008/0215204 A1 | 9/2008 | Roy et al. | |
| 2009/0087029 A1 | 4/2009 | Coleman et al. | |

OTHER PUBLICATIONS

U.S. Appl. No. 10/937,919, filed Sep. 9, 2004, Emigh et al.
U.S. Appl. No. 10/938,487, filed Sep. 9, 2004, Emigh et al.
Final Office Action mailed Mar. 26, 2008 in U.S. Appl. No. 10/937,919 13 pages.
Non-Final Office Action mailed Aug. 10, 2007 in U.S. Appl. No. 10/937,919 15 pages.
Non-Final Office Action mailed Dec. 24, 2008 in U.S. Appl. No. 10/937,919 14 pages.
Non-Final Office Action mailed Sep. 4, 2008 in U.S. Appl. No. 10/938,487 9 pages.
Final Office Action mailed Sep. 23, 2009 in U.S. Appl. No. 10/937,919 15 pages.
Final Office Action mailed May 7, 2009 in U.S. Appl. No. 10/938,487 10 pages.
Non-Final Office Action mailed Nov. 19, 2009 in U.S. Appl. No. 10/938,487 8 pages.
Non-Final Office Action mailed Jun. 4, 2009 in U.S. Appl. No. 12/001,692 7 pages.
Notice of Allowance mailed Feb. 5, 2010 in U.S. Appl. No. 12/001,692 11 pages.

* cited by examiner

LOCATION-BASED TASKS

CROSS REFERENCE TO RELATED APPLICATIONS

This application claims priority to U.S. Provisional Patent Application No. 60/501,691 entitled LOCATION-BASED SERVICES, filed Sep. 9, 2003, which is incorporated herein by reference for all purposes.

FIELD OF THE INVENTION

The present invention relates generally to the areas of computer software and portable electronics, more specifically to the area of location-aware devices.

BACKGROUND OF THE INVENTION

Technology for determining location has become small and inexpensive, facilitating the creation of location-aware devices. However, current location-aware devices provide limited functions.

It would be useful to have increased functionality for location-aware devices.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
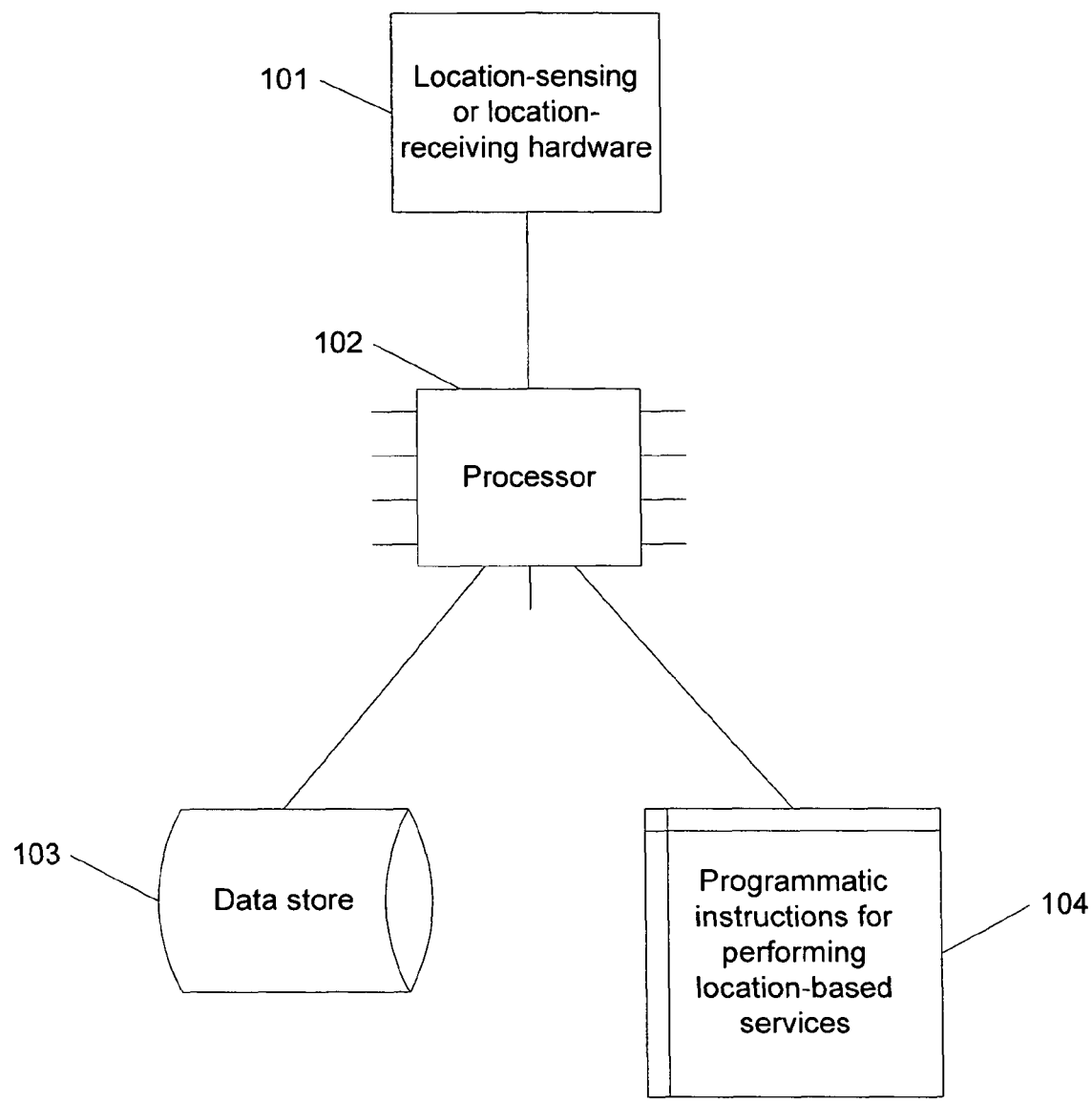
FIG. 1 is an illustrative diagram of a system for performing location-based services according to some embodiments.

FIG. 1 is an illustrative diagram of a system for performing location-based services according to some embodiments. In this example, hardware capable of sensing a location or receiving location information 101 may be connected to a processor capable of executing instructions to perform location-based services 102. Examples of hardware capable of sensing a location include a GPS receiver, and one or more accelerometers or gyroscopes. An example of hardware capable of receiving location information is an interface capable of connecting to a network over which location information may be transmitted, for example a wireless network such as 802.11, GPRS or Bluetooth.

A data store 103 is shown to be connected to the processor 102. A data store may be any medium capable of storing data, for example read-only memory, magnetic or optical storage, non-volatile electronic memory such as flash memory, or battery-powered electronic memory such as DRAM.

Programmatic instructions for performing location-based services 104 may be made available to the processor 102. Examples of media in which programmatic instructions for performing location-based services may be contained include read-only memory, magnetic or optical storage, and random-access memory such as DRAM or flash memory.

Figure 2:
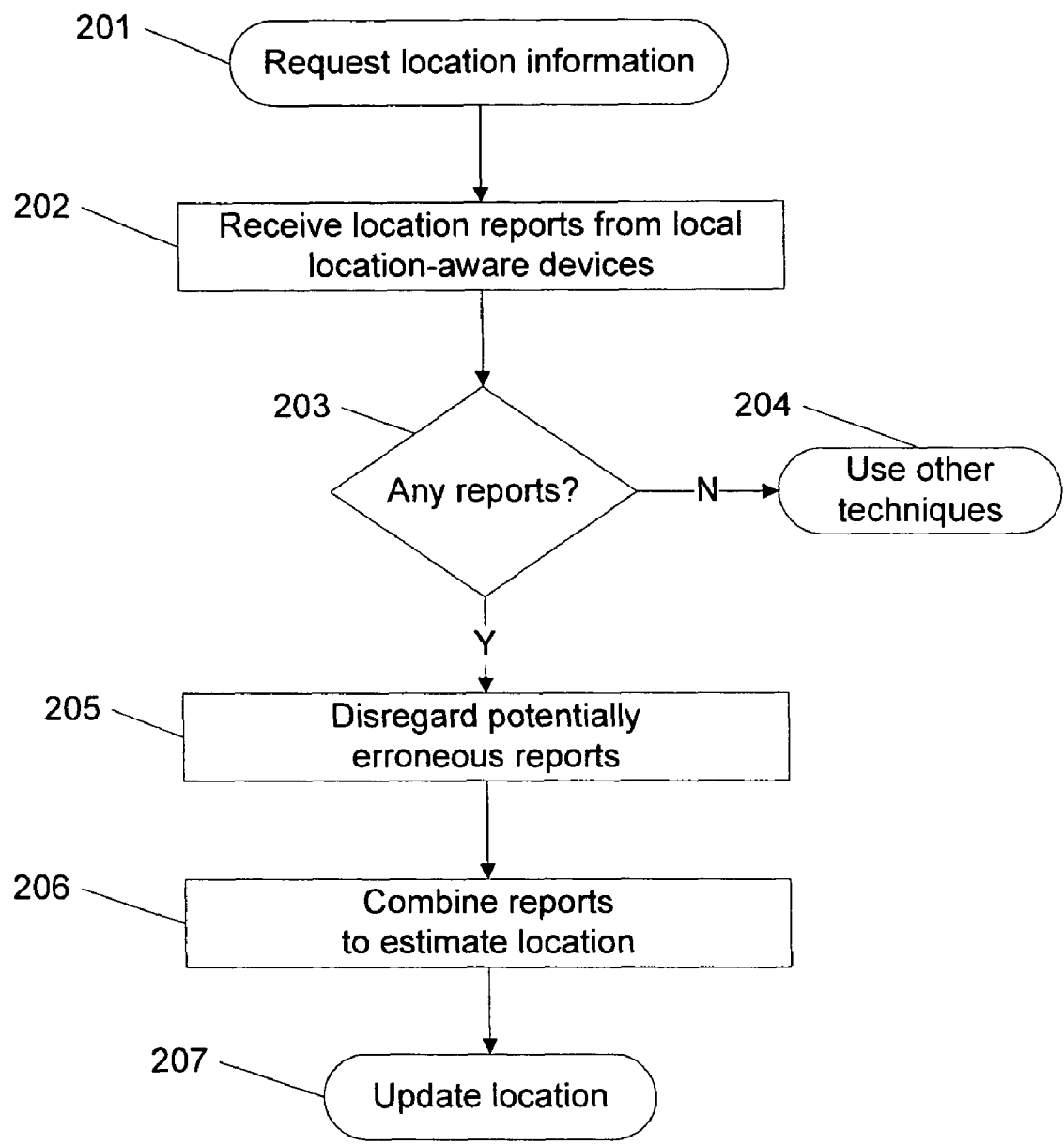
FIG. 2 is a flow diagram of a method for obtaining location information from one or more location-aware peer devices according to some embodiments.

FIG. 2 is a flow diagram of a method for obtaining location information from one or more location-aware peer devices according to some embodiments. A "location-aware device" or "LAD" refers herein to any device that can be aware of its location, either directly or indirectly. Examples of LADs include a personal digital assistant which has the capability to communicate with Global Positioning System (GPS) satellites (for example, an HP iPaq 5555 with a Pharos PF022 card, a Handspring Visor with a Magellan GPS Companion module, or a Garmin iQue 3600), an automotive navigation unit such as a Siemens IDIS or TetraStar (as used in BMW and Mercedes automobiles), and a cellular telephone capable of receiving location information. Examples of ways in which a LAD can be made aware of its location include satellite-based services such as GPS, accelerometers, gyroscopes, local transmissions from fixed or mobile locations, manual input by a user, and receiving location information from another LAD. In some embodiments, a LAD may make location information programmatically available to software running on it, for example via the National Marine Electronics Association standard NMEA-0183.

In this example, location information may be requested (201). For example, a request may be transmitted (for example using a broadcast) over a communications network such as a wireless network. Examples of wireless networks include 802.11 and Bluetooth. In some embodiments, a request may be implicit. One example of an implicit request is not making a request. Another example of an implicit request is another communication, for example a broadcast indicating the presence of a device, which may be taken as an implicit request for location information. One or more location reports may be received from local location-aware devices (202). A location report refers herein to a communication containing a location of the device sending the report, for example in latitude and longitude. In some embodiments, a reporting device may have measured its own location, for example using location-sensing hardware such as a GPS receiver. In some embodiments, a reporting device may have determined its location from location reports received from other entities. In some embodiments, a device providing a report may be a peer of a requesting device, for example a mobile device such as a PDA, cellular phone or automotive navigational system. An example of receiving one or more location reports is to receive them over a network medium through which a request was transmitted, for example a wireless network such as Bluetooth or 802.11, or using a mode of transmission specified in a request.

It may be determined whether a location report has been received (203). If a location report has not been received (203), then other techniques are used in this example (204). Examples of other techniques include invalidating any location awareness until a location can be ascertained, using the last known location, and extrapolating from the last known location.

If a location report has been received (203), then one or more potentially erroneous location reports are optionally disregarded in some embodiments (205). An example of disregarding a location report is to not include the location report in a location calculation. An example of disregarding potentially erroneous location reports is to disregard reports containing locations that are substantially different than average. In one example of disregarding locations substantially different than average, one or more location reports that contain a location more than a threshold distance from the average reported location, for example a hundred meters, may be disregarded. In some embodiments, one or more location reports containing locations more than a threshold distance from the average reported location may be disregarded when at least a threshold number of reports, for example two, are received containing distances within the threshold distance from the average. In another example of disregarding locations substantially different than average, one or more reports that are furthest from the average may be disregarded based on a fixed or variable ratio, such as ignoring the 10% of reports furthest from the average location, or any report varying from the average by more than 10%. In another example of disregarding locations substantially different than average, one or more reports that are furthest from the average may be disregarded based on a statistical measure such as disregarding any locations greater than some threshold number of standard deviations (for example two) from average. In some embodiments, location(s) substantially different than average may be disregarded when more than a threshold number of location reports have been received, for example three. In some embodiments, disregarding locations substantially different than average may be required to eliminate at least a predetermined number of reports, for example one. In some embodiments, one or more X and/or Y coordinates within location reports may be separately disregarded, for example an X or Y coordinate substantially different than average. Any technique discussed above for disregarding reports substantially different than average may be applied separately to X and Y coordinates.

Location reports may be combined to estimate the current location (206). One example of combining location reports is to average location reports received from location-aware devices. In some embodiments, averaging reports may include calculating an arithmetic mean. In some embodiments, averaging reports may include calculating a median. In some embodiments, averaging reports may include calculating a mode. In some embodiments, an average may be weighted by the observed signal strength from each reporting device. Another example of combining location reports is to use both a received location report and the direction from which the location report signal arrived. A direction from which a location report signal originates may, for example, be obtained from a Doppler direction finder, or from an effectively rotating directional beacon transmission such as is used on aircraft VOR navigational systems, which establishes a radial direction from a transmitter to a receiver. In some embodiments, directions from sources of location reports may be used to triangulate. In one example of triangulation, if radial directions are received from two transmitters, with one transmitter due east and the other due north, then a current location is derived in this example at the latitude of the due east transmitter, and the longitude of the due north transmitter. In another example of triangulation, if radial directions are received from two transmitters of location reports, and the radial directions are not collinear with a receiver, then a unique location for the receiver may be derived using trigonometric methods well known to those skilled in the art. In another example of triangulation, radial directions to three or more transmitters may be acquired, and a receiver location may be estimated when all the radials do not align at a single point In some embodiments, a least squares error estimate of the receiver's position may be derived based on triangulation relative to three or more radials to known or specified locations. In this example, an error metric in an estimate may for example be defined to be the sum of the squares of the distances from the receiver's estimated location to the radial lines.

In some embodiments, X and Y coordinates, such as a latitude and longitude, may be calculated separately from locations reported by locally accessible LADs. In one example of separately calculating X and Y coordinates, average X and Y coordinates may be calculated from the X and Y coordinates contained within location reports.

In some embodiments, a previous location, such as the last known location, may be taken into consideration when evaluating a location in a location report, for example by disregarding reports that are far from the last known location. For example, a new location reading may be analyzed to calculate the distance (for example, the number of miles or degrees) between it and a previous location. If this distance is greater than a threshold, then the location in the location report may be disregarded. In some embodiments, the threshold may be a constant, for example 600 miles. In some embodiments, the amount of time since the previous location was calculated may be taken into account in determining a threshold, for example by multiplying a constant threshold such as 600 miles by the amount of time (for example the number of hours) since the previous location was calculated. In some embodiments, a combination of elapsed time and a distance threshold may be expressed as a speed threshold, for example 600 miles per hour in the example above. In some embodiments, a time threshold may be combined with a distance threshold, including a combination of elapsed time and distance threshold, for example by applying the distance threshold only for location reports received less than a threshold period of time, such as five hours, since the last location report. In some embodiments, when multiple consistent location reports beyond a threshold are received, the location may be accepted.

When one or more location reports have been combined and/or disregarded (205), the location is updated in this example (206).

Figure 3:
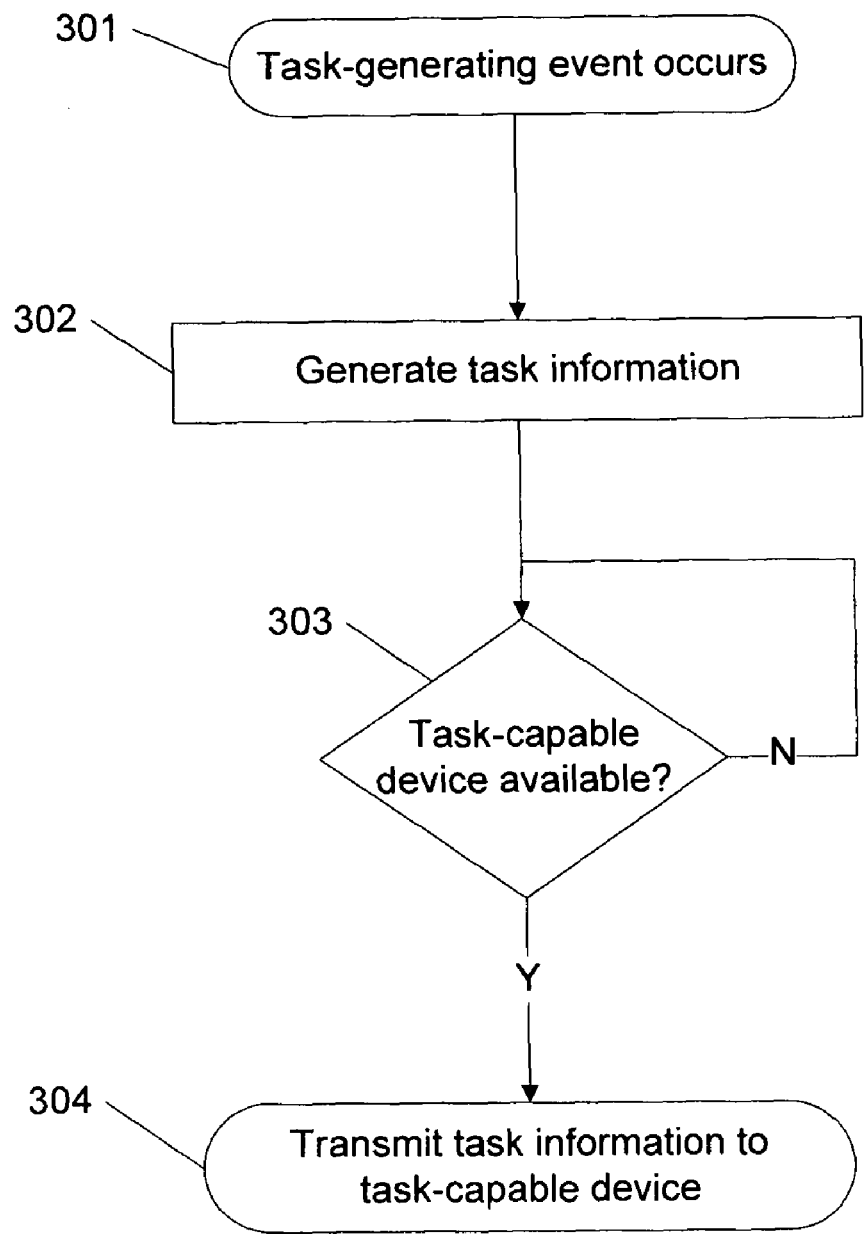
FIG. 3 is a flow diagram of a method for automatically adding tasks to a task list according to some embodiments.

FIG. 3 is a flow diagram of a method for automatically adding tasks to a task list according to some embodiments. In this example, a task-generating event may occur (301). An example of a task-generating event is a depletion detection, for example a car running low on gas, which could for example be detected by a monitor associated with the car's gas tank. Another example of a task-generating event is the detection of a mechanical failure, for example the failure of an automobile or appliance. Task information may be generated (302). An example of generating task information is to generate task data specifying an item to be purchased, such as gasoline, and optionally a time to purchase it, for example immediately or as soon as possible.

It is determined whether a task-capable device is available (303). A task-capable device refers herein to a device capable of accepting a general-purpose task and prompting some action on it, for example a computer or PDA running software that tracks and organizes tasks a user should perform. An example of determining whether a task-capable device is available is to attempt to contact a task-capable device over a network such as a wireless network, for example 802.11 or Bluetooth. In some embodiments, an attempt to contact a device may include an attempt to contact a particular device, for example a device that has been configured to accept tasks from the task generator. In some embodiments, an attempt to contact a device may include a broadcast message to request an available task-capable device to identify itself. If there is no task-capable device present, the presence of a task-capable device is awaited in this example (303), for example by waiting for notification from a device or by delaying and re-attempting contact.

If a task-capable device is available (303), then task information is transmitted to a task-capable device (304). An example of transmitting task information to a task-capable device is to transmit task information over a network, for example a wireless network such as 802.11 or Bluetooth.

Figure 4:
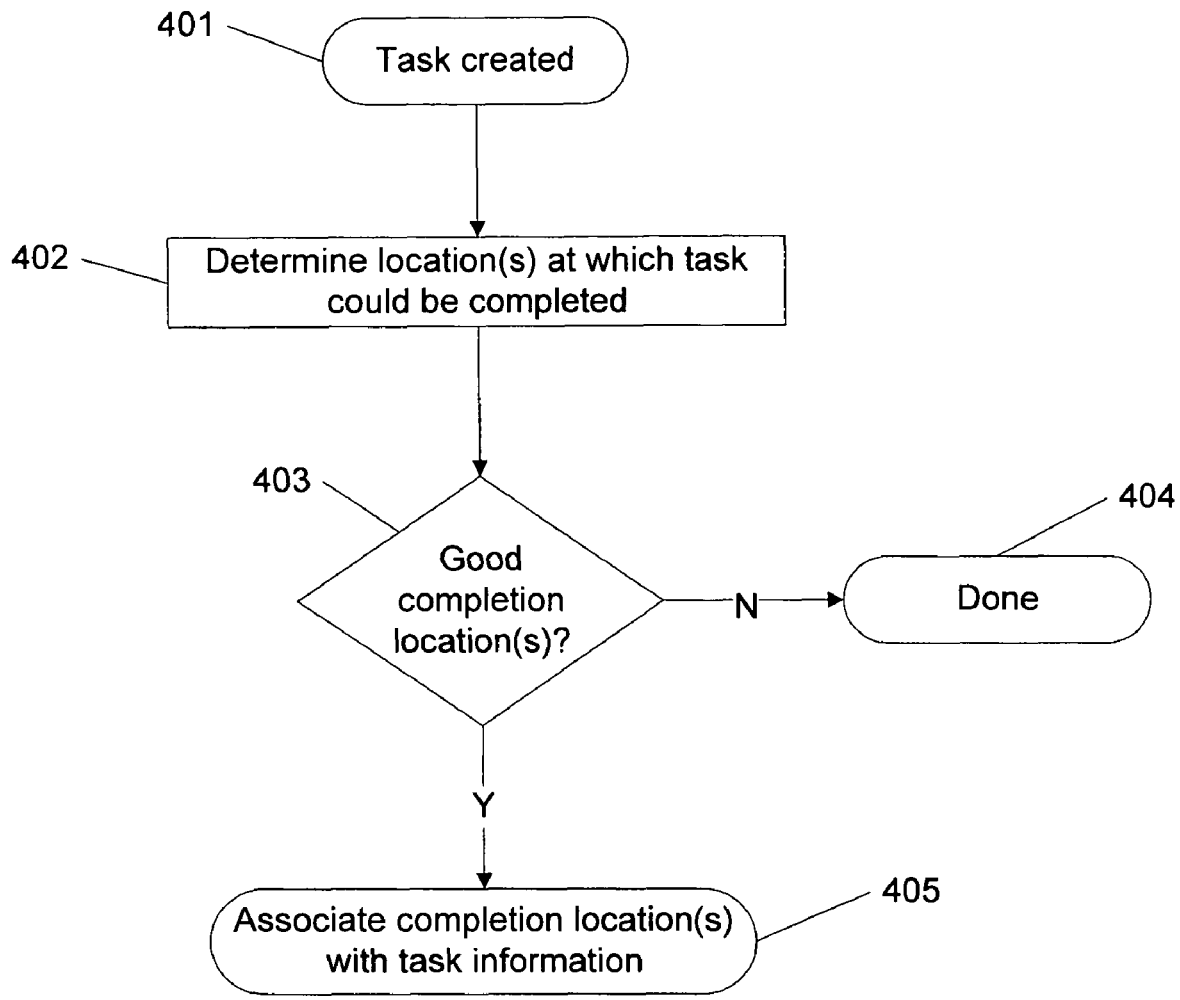
FIG. 4 is a flow diagram of a method for associating a task with one or more locations at which a task may be completed according to some embodiments.

FIG. 4 is a flow diagram of a method for associating a task with one or more locations at which a task may be completed according to some embodiments. In this example, a task is created (401). An example of creating a task is for a user to enter a task. Another example of creating a task is to receive a task from another device, for example through a synchronization operation or an automatic task generation such as described in conjunction with FIG. 3.

One or more completion locations at which the task could potentially be completed are determined (402). One example of determining a completion location is for a user to enter a location explicitly. One example of entering a location explicitly is to enter an address associated with the task, such as "3456 Main Street." Another example of entering a location explicitly is to enter the name of a place, such as a business name (for example, "Safeway"), at which the task may be completed. In this example, the name may be looked up in a business directory to determine one or more completion locations. Another example of determining a completion location is for a user to enter a category of location, such as "hardware store" or "grocery store," at which the task may be completed. In this example, the category may be looked up in a business directory such as an electronic yellow pages to determine one or more completion locations.

Another example of determining a completion location is to analyze a task to determine one or more completion locations. In some embodiments, a reference a to a completion location within a task description may be detected, for example by substring matching against one or more predetermined completion location descriptions. For example, the task entry "hardware store: hammer, nails" could be determined to be a reference to a category of "hardware store," which could then be looked up in a business directory such as an electronic yellow pages to determine one or more completion locations. In some embodiments, the content of tasks may be analyzed (for example, by a Bayesian text classifier) and one or more appropriate completion locations may be derived from the analysis. For example, a task entry such as "spinach, salmon, milk" could be classified as a grocery list. This could be associated with the category "grocery store," which could be looked up in a business directory such as an electronic yellow pages to determine one or more completion locations.

Another example of determining a completion location is to compare a task with one or more previously completed tasks to derive a completion location from a previous completion location for a similar previous task. A previous completion location for a similar previous task may, for example, have been derived as discussed in conjunction with FIG. 7. One example of determining whether a task is similar to a previous task is to determine whether the task descriptions are substantially identical. Another example of determining whether a task is similar to a previous task is to perform lexical entropy analysis, in which two task descriptions are considered "similar" if their population of "high-information" words (for example, words representing less than 0.5% of word instances in a corpus such as all task descriptions, plus optionally certain key words always classified as "high-information" by the software), are substantially identical. Another example of determining whether a task is similar to a previous task is to classify tasks using a classifier such as a Bayesian classifier. An example of determining whether a task is similar to a previous task using a classifier is to use completion locations as classifications (i.e. categories) and use a text classifier such as a Bayesian classifier on task descriptions, using task descriptions and the locations at which they were performed as training data. In this example, a task description can then be implicitly classified as similar to others assigned to the same completion location, or a completion location in the same category, if a probability metric associated with its classification is greater than a threshold. An example of deriving a completion location from one or more previous completion locations for similar previous tasks is to use the previous completion location(s) for the completion location(s). Another example of deriving a completion location from one or more previous completion locations is to determine a category in which the previous completion location(s) fit, for example "hardware store," and looking up one or more completion locations based on the category.

If a completion location has not been found, or any completion locations that have been found have low probabilities associated with them, for example because a match was poor with a previous completion location (403), then no completion location is assigned in this example (404). In some embodiments, a user may be prompted to enter a completion location. If a completion location has been found (403), then the completion location(s) are associated with the task information in this example (405). An example of associating one or more completion locations with task information is to include the completion location(s) in a record associated with the task, for example a database record or part of a file.

Figure 5:
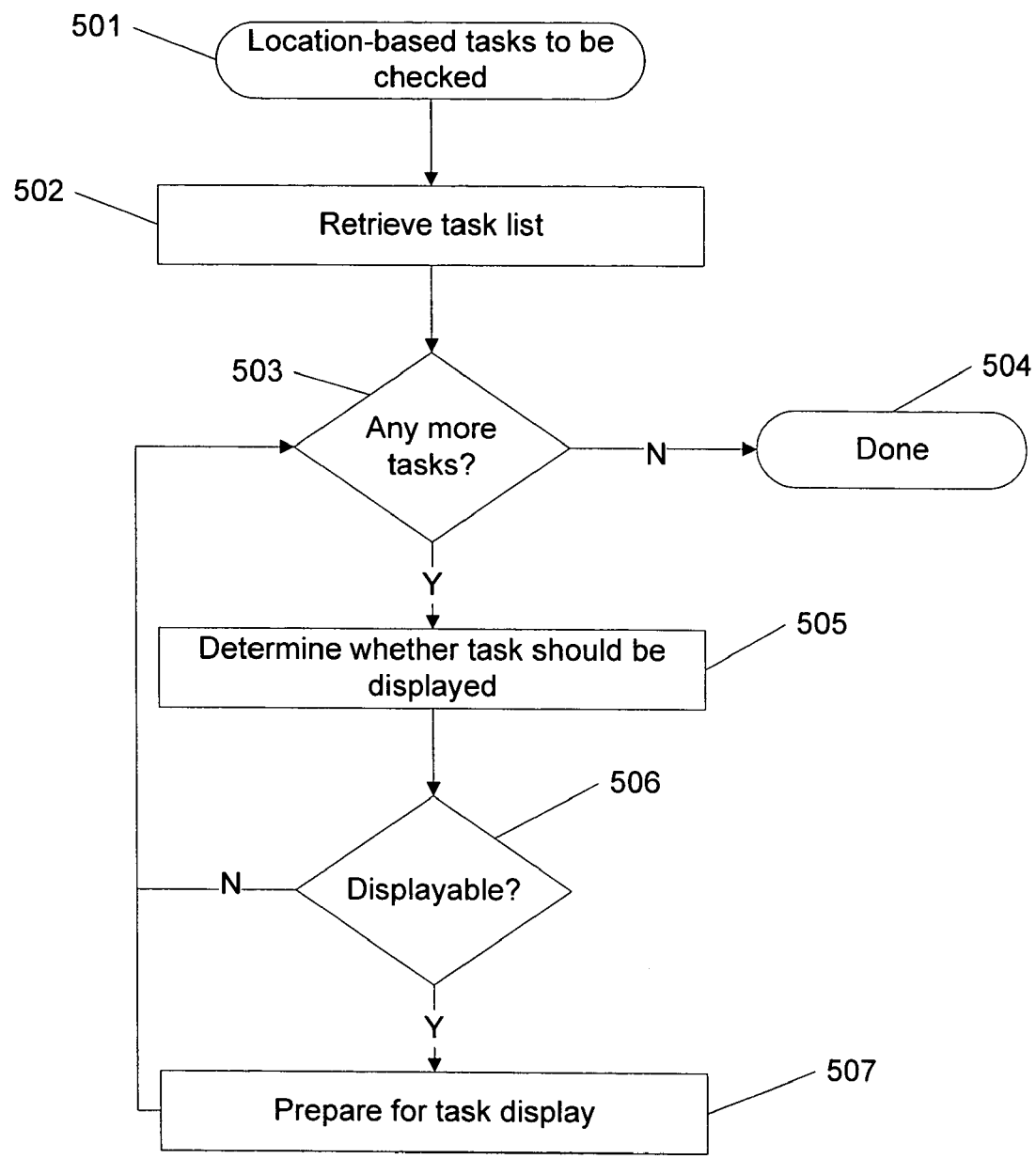
FIG. 5 is a flow diagram of a method for displaying locations at which tasks may be performed according to some embodiments.

FIG. 5 is a flow diagram of a method for displaying locations at which tasks may be performed according to some embodiments. In this example, location-based tasks are to be checked (501). An example of a reason that location-based tasks may be checked is because a LAD has been turned on. Another example of a reason that location-based tasks may be checked is because a user has selected a view of a task list. Another example of a reason that location-based tasks may be checked is that a LAD has moved to a new location. Another example of a reason that location-based tasks may be checked is that a predetermined period of time, such as one minute, has elapsed since the last time location-based tasks were checked.

A task list may be retrieved (502). In some embodiments, a task list may be kept explicitly. In some embodiments, a task list may be derived from other data, for example an unstructured to-do list, or calendaring data. If there are no more tasks to process in the list (503), then location display is complete in this example (504). In some embodiments, one or more completion locations for tasks that have been determined to be displayable, for example completion locations contained on a list of displayable tasks, may be displayed. An example of displaying a completion location is to display it on a map. In some embodiments, information about one or more tasks that have been determined to be displayable, for example tasks contained on a list of displayable tasks, may be displayed. An example of displaying task information is to display a task and optional associated location, for example when a user views a task list. In some embodiments, tasks and/or task completion locations may be displayed as text or audio (for example a characteristic tone, or synthesized speech). In some embodiments, an indication may be provided that a task may be performed at a nearby location, for example an icon viewable on the screen of a LAD. In some embodiments, a displayable list of tasks may be provided through a programmatic interface. In some embodiments, tasks and associated completion locations may be retained on a displayable list of tasks, and presented to the user when an action is taken, such as a request to display nearby tasks or viewing a task list.

If more tasks are available for processing (503), then a task is selected from the task list for processing in this example. It may be determined whether the task should be displayed (505). One example of determining whether a task should be displayed is to determine whether a completion location for the task is within a threshold distance from the user, for example 100 meters, or one mile, and determine that it should be displayed if so. Another example of determining whether a task should be displayed is to determine whether a completion location for the task is within a threshold distance from a target location, or within a target area. One example of determining an appropriate target location or area is to receive it from a user. Another example of determining an appropriate target location or area is to project a location or area in which a user is likely to be, for example a location or area along a route planned by a navigational system, or a location or area near a location associated with a calendar item.

If the task should not be displayed (506), then the next task is selected in this example (503). If the task should be displayed (506), then task display is prepared in this example (507). In some embodiments, preparing to display a task may include displaying a completion location for the task. An example of displaying a completion location is to display it on a map. In some embodiments, preparing to display a task may include displaying task information. An example of displaying task information is to display a task and optional associated location, for example when a user views a task list. In some embodiments, tasks and/or task completion locations may be displayed as text or audio (for example a characteristic tone, or synthesized speech). In some embodiments, preparing to display a task and/or completion location includes adding information about a task and/or completion location to a list of items that may later be displayed. In some embodiments, preparing to display a task and/or completion location includes providing an indication that a task may be performed at a nearby location, for example an icon viewable on the screen of a LAD. The next task may be processed (503).

An example application of the method illustrated in FIG. 5 is to display nearby locations at which tasks on a user's task list may be displayed, for example when the user looks at the screen of an LAD, or when a user looks at his or her task list. For example, a user could be in a Safeway. When he or she requests to view a task list (for example, by selecting its icon), a task containing the grocery list could automatically be presented.

Figure 6:
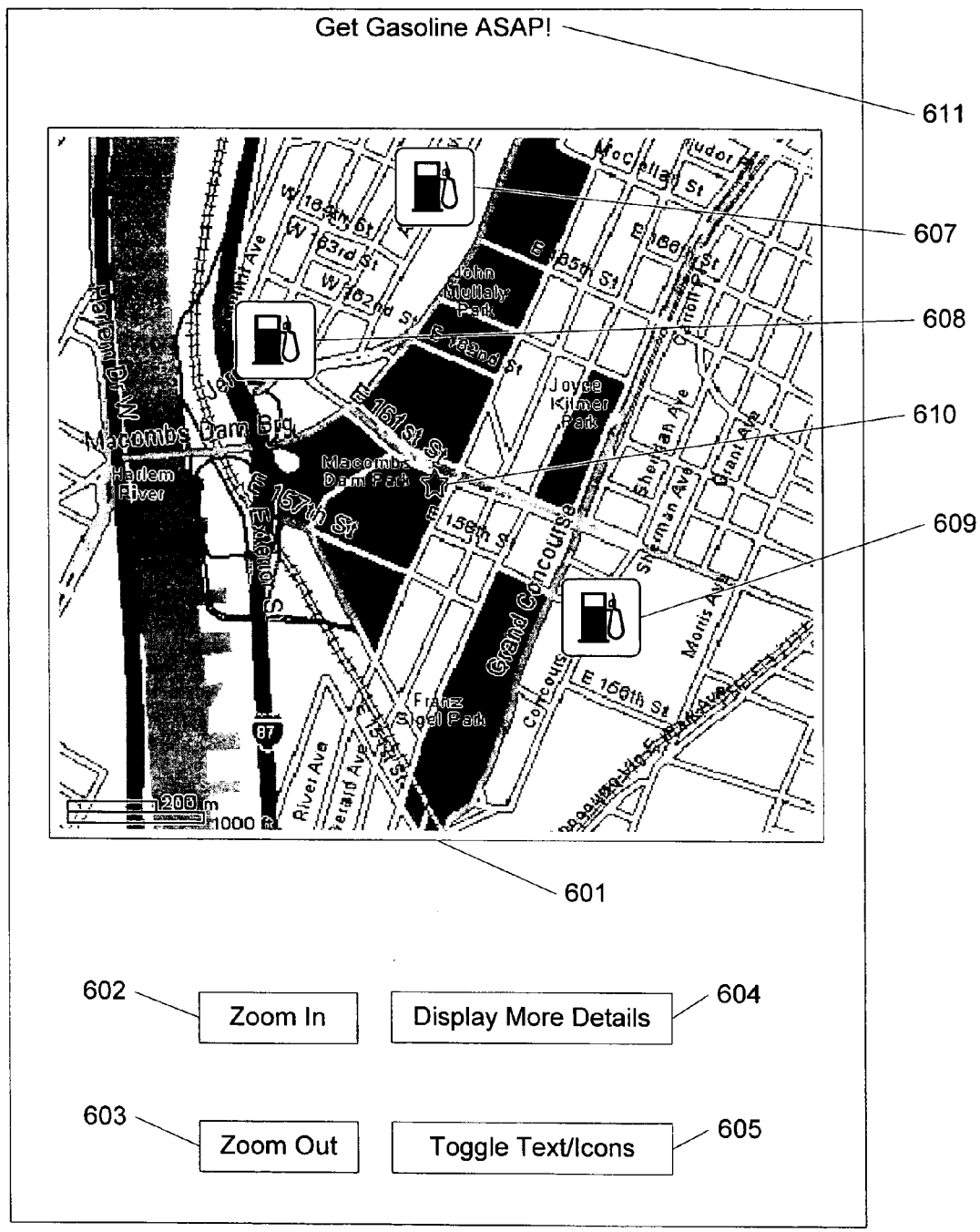
FIG. 6 is an illustrative diagram of a user interface for displaying completion locations for a task according to some embodiments.

FIG. 6 is an illustrative diagram of a user interface for displaying completion locations for a task according to some embodiments. An example of a situation in which this user interface could be displayed is when a task list display has been requested or triggered, for example as discussed in conjunction with FIG. 5. In this example, a LAD is displaying a map 601 showing a task description 611, the location of a mobile communications device 610 and the location of completion locations for the task 607, 608, 609, which may for example have been ascertained as discussed in conjunction with FIG. 4. In this example, the task description 611 is "Get gasoline ASAP" and completion locations 607, 608, 609 are nearby gas stations at which gas may be purchased. The task to purchase gasoline may, for example, have been automatically generated as discussed in conjunction with 301 of FIG. 3. In this example, additional information associated with completion locations 607, 608, 609 may be displayed by selecting a button 604, and display options for completion locations 607, 608, 609 may be altered by selecting a button 605. In this example, the map 601 may be zoomed in or out using buttons 602, 603.

Figure 7:
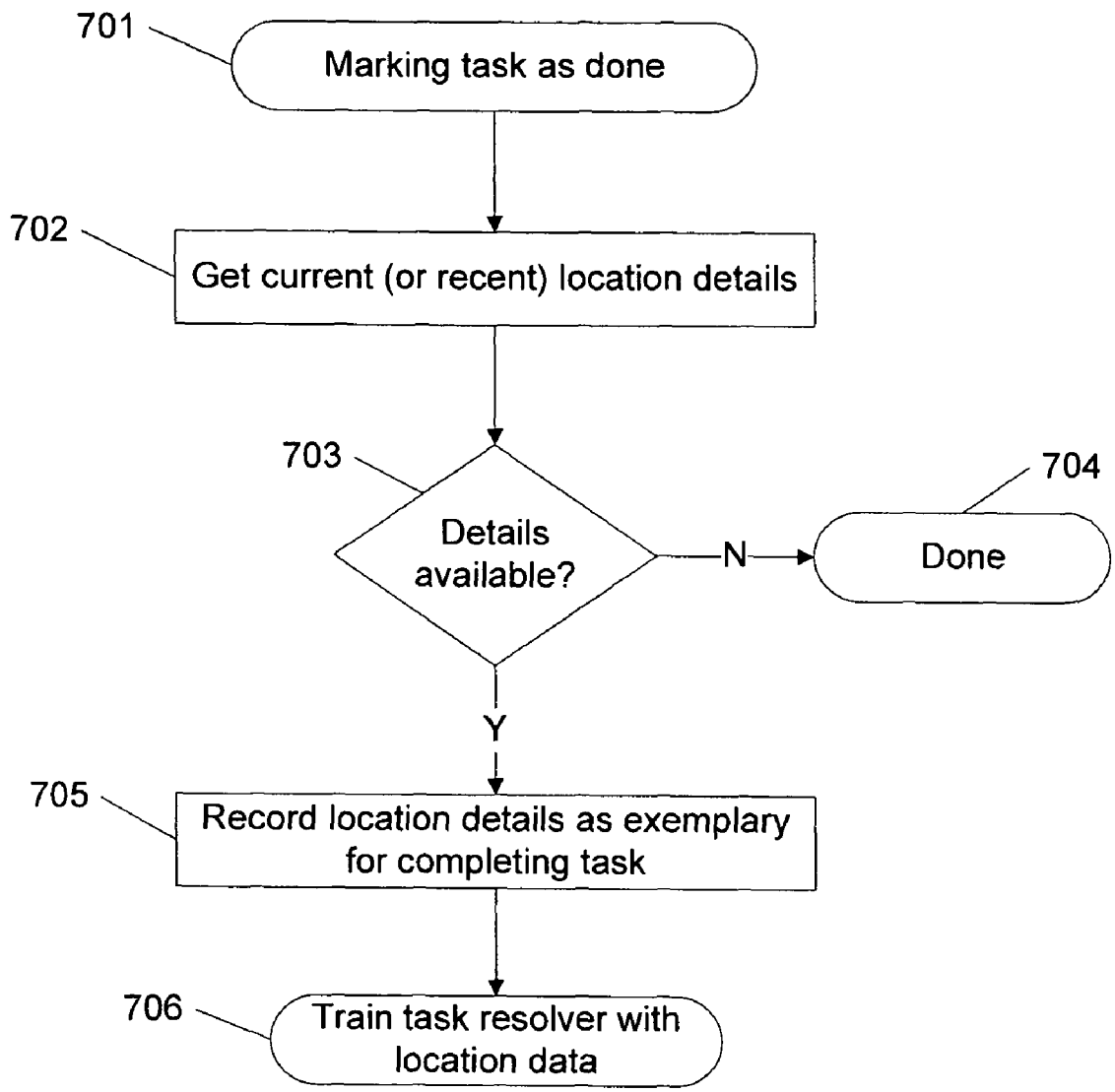
FIG. 7 is a flow diagram of a method for automatically deriving task completion locations according to some embodiments.

FIG. 7 is a flow diagram of a method for automatically deriving task completion locations according to some embodiments. In this example, a task is completed (701). One example of a task being completed is for a user to mark it as completed, for example by "crossing it out" in a software program that provides task management functionality. Current and/or recent location details are obtained (702). An example of obtaining location details is to retrieve them from a log of recent locations, and/or a current location reading. If no location details are available (703), for example if a LAD relies on other LADs for location information and none has been available, or GPS reception has been unavailable, then a completion location for the task is not derived in this example (704). In some embodiments, a completion location for the task may be manually specified, for example by a user clicking on a location on a map or entering an address.

If location details are available (703), then location details are recorded in this example (7065). An example of recording location details is to store recent location history (for example, location information for the past hour) associated with information about the task just completed. A task resolver may be trained with the example data (706). In some embodiments, a task resolver may learn associations between tasks and completion locations based on location information. One example of the operation of a task resolver is for the task resolver to associate a task entry with the current location at the time it was marked as completed, for example using the current location as the completion location for the task. Another example of the operation of a task resolver is to examine historical information associated with the resolution of similar tasks and determine points of commonality, for example similar locations, and select a point of commonality (for example, a location in the historical location information associated with task completions such that similar locations are associated with more task completions than any other location). Ways of determining "similar" tasks are discussed in conjunction with 402 of FIG. 4. Another example of the operation of a task resolver is to select a known location near the location at which the task was marked as completed, such as a location that a user has habitually visited or a location in the user's address book, as a completion location. Another example of the operation of a task resolver is to determine a category of location (for example, a hardware store or a grocery store) contained in historical location information associated with multiple resolutions of similar tasks, and associate that category of location with the task(s) as a completion location.

An example of an application of the method shown in FIG. 7 is when a user electronically indicates that a to-do list entry titled "Bring lunch to grandma" has been completed, for example by deleting it from his or her to-do list. In this example the system might subsequently associate identically or similarly named tasks with the location at which the user completed that task, for example because the user indicated that the task was completed at grandma's house, or because multiple similar entries had been marked as completed when the user had visited grandma's house in the past hour, or because grandma's house was in the user's address book and was nearby when the user marked the task as completed.

In some embodiments, automatically derived completion locations may subsequently be used to determine and/or display appropriate completion location candidates for tasks, for example as described in conjunction with FIG. 4.

Figure 8:
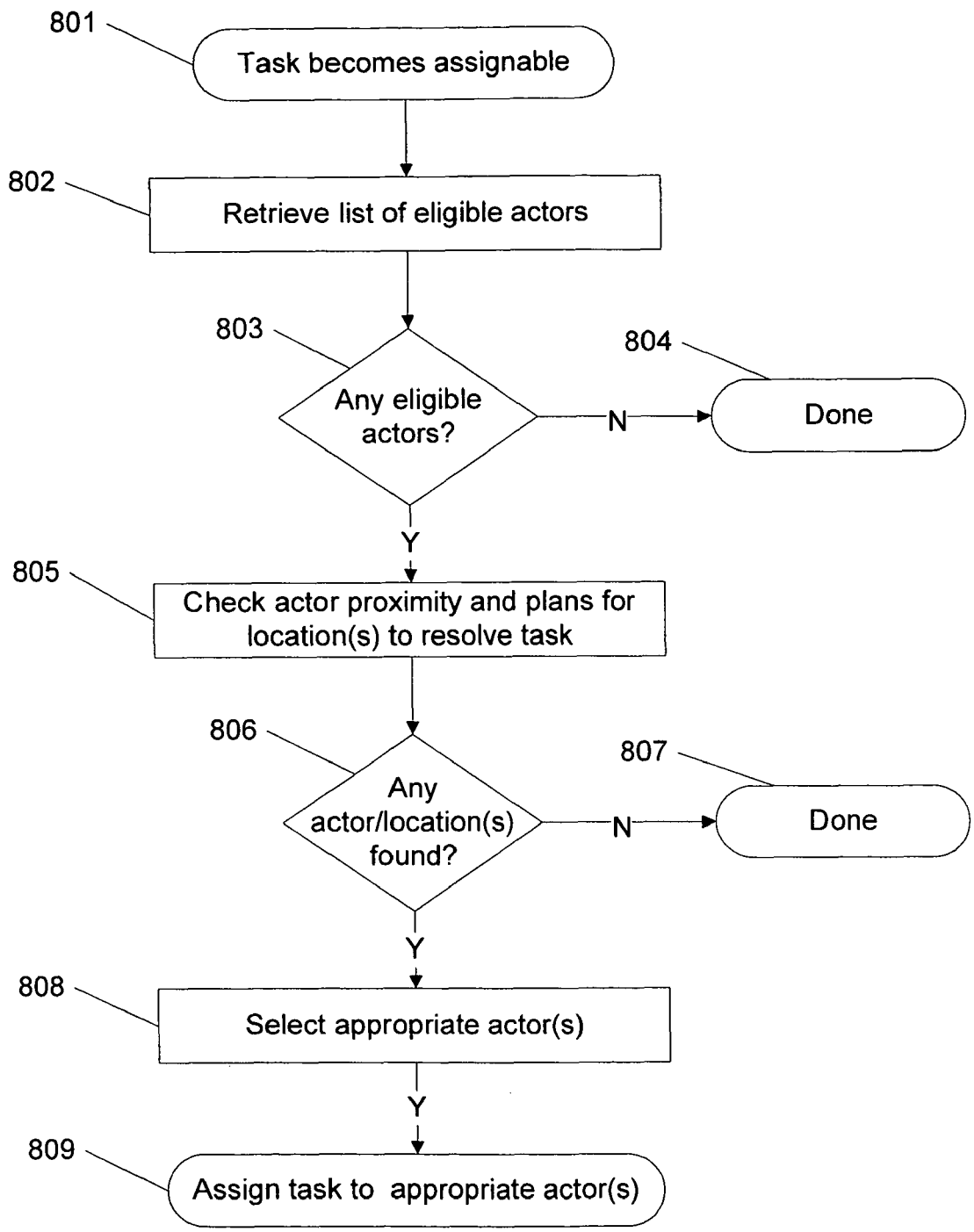
FIG. 8 is a flow diagram of a method for assigning a task to a task recipient according to some embodiments.

FIG. 8 is a flow diagram of a method for assigning a task to a task recipient according to some embodiments. In this example, a task becomes assignable (801). One example of a task becoming assignable is when a task is created, for example by entering a new task into a program that manages tasks. Another example of a task becoming assignable is for an assignee of the task to decline to perform the task. Another example of a task becoming assignable is for the location of an assignee or another potential task recipient to change so that a reassignment of a task to a new actor is appropriate, for example because the actor is closer to a location at which the task can be performed. A list of eligible actors may be retrieved (802). An actor refers herein to any potential recipient of a task equipped with a LAD, for example a LAD that has been registered as being part of a task-receiving population. An example of retrieving a list of eligible actors is to retrieve a list of actors from a database or other configuration file such as a registry or flat file. In some embodiments, multiple populations of actors may be maintained, and one or more populations may contain actors eligible for a particular task. In some embodiments, a task may be associated with one or more particular population of actors, for example because the task creator specified the association.

If no actors are eligible to perform the task (803), then the task is not assigned to an actor in this example (804). If one or more actors are eligible, current and/or planned future location(s) of eligible actors may be checked (805). An example of a planned future location is a location along a path set by a navigational system such as an automotive navigational system. Another example of a planned future location is a location on a preplanned service route for a vehicle, such as a FedEx or postal delivery truck. Another example of a planned future location is a calendar item with an associated location. Another example of a planned future location is a task with an associated completion location. If no actor locations are available (806), then the task is not assigned to an actor in this example (807). In some embodiments, task may be manually assigned to an actor, for example by a user selecting an actor from a list of eligible actors. If one or more actor locations are available (806), then one or more appropriate actors are selected in this example (808). An appropriate actor may be selected based on a variety of criteria, such as distance from task and availability based on schedule, using optimization algorithm(s) known to those skilled in the art. An example of selecting an appropriate actor is to select an actor whose present location is closest to a completion location for the task. Another example of selecting an appropriate actor is to select an actor whose planned future locations include a location nearest to a completion location for the task. Another example of selecting an appropriate actor is to select an actor who already has a task with a completion location that is also a completion location for the task requiring assignment. Another example of selecting an appropriate actor is to select an actor whose schedule, for example as determined by examining electronic calendar data, contains sufficient free time to perform the task, as determined, for example, by current and/or planned future locations and a completion location for the task. In some embodiments, exactly one actor may be selected as appropriate. In some embodiments, more than one actor may be selected as appropriate.

The task may be assigned to one or more actors (809). An example of assigning the task is to distribute task information, such as a task description and zero or more completion locations, to an actor, for example through a network such as the internet, or a wireless network, for example GPRS or 802.11. In some embodiments, a task may be assigned to exactly one actor. In some embodiments, a task may be assigned to more than one actor. In an example of assigning a task to more than one actor, a task notification may be transmitted to multiple actors, and the first actor to confirm that he or she will perform the task is assigned the task. In another example of assigning a task to more than one actor, a task notification may be transmitted to multiple actors, and may be rescinded when one actor marks the task as completed. In another example of assigning a task to more than one actor, a task may require multiple actors and multiple actors may perform the task, or may perform elements of the task.

An example of an application of the method illustrated in FIG. 8 is managing pickups for delivery trucks. In this example, delivery trucks include LADs that transmit their locations back to a central server. When a pickup order is entered, the locations of trucks may be taken into consideration as well as their planned routes and workloads in deciding which truck should be sent to pick up the new order.

Another example of an application of the method illustrated in FIG. 8 is adding an item to a grocery list. In this example, a father in a family adds a task to "buy infant formula" into his PDA. The locations of other family members' LADs are polled and used to assign a person to the new task. For example, the mother might be driving close to a store on her way back from work, or the son might be in a grocery store buying soda, and could receive notification to buy infant formula also. In this example, an assignment may be made to both actors, and the son, even though already in the grocery store, may not notice the task assignment. The mother may notice and confirm the task assignment, and receive the task to pick up infant formula at a planned future location near her path from work to home.

Figure 9:
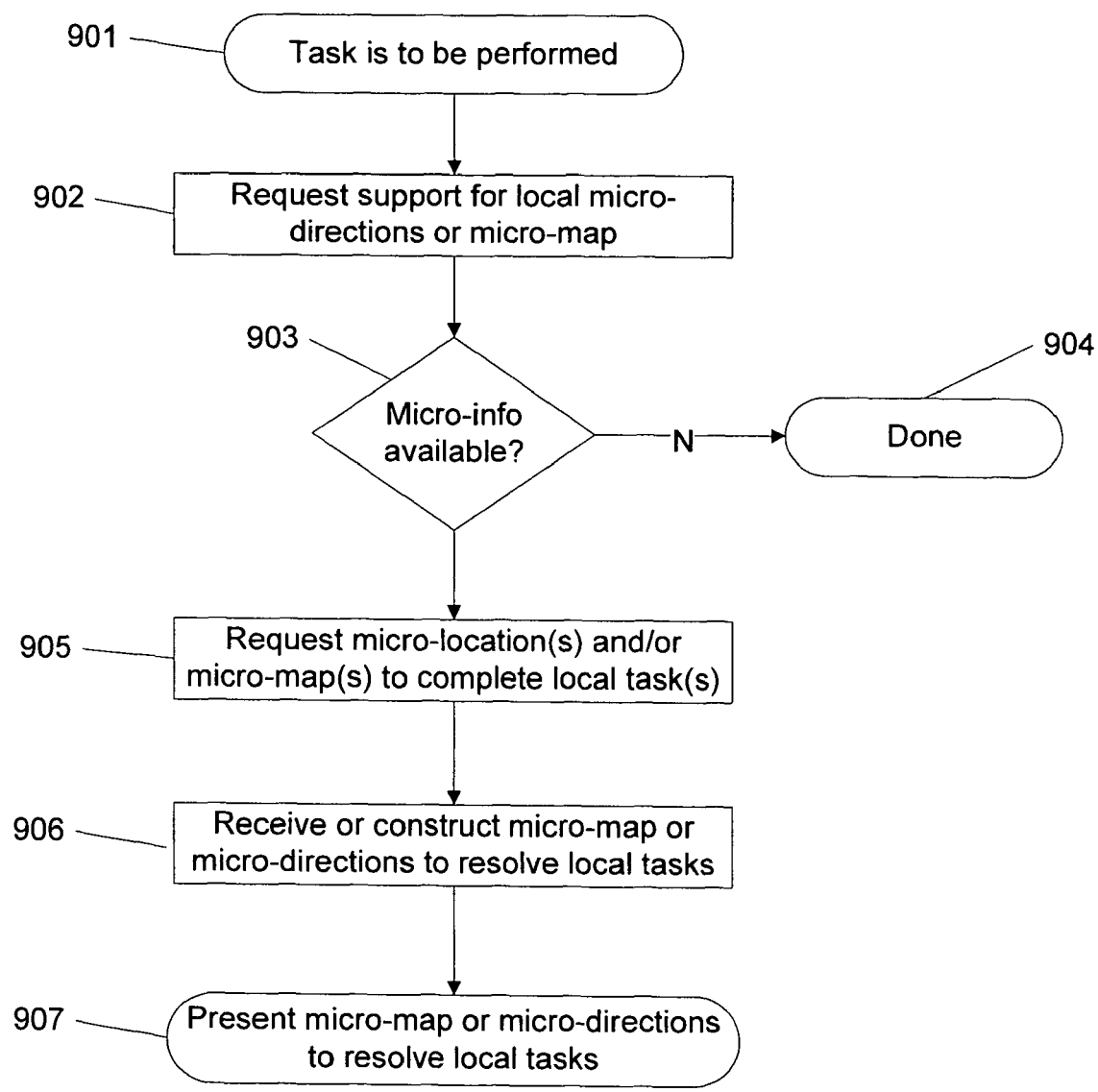
FIG. 9 is a flow diagram of a method for receiving and presenting location-based guidance for task fulfillment according to some embodiments.

FIG. 9 is a flow diagram of a method for receiving and presenting location-based guidance for task fulfillment according to some embodiments. In this example, one or more tasks are to be performed at the current location of a LAD (901). An example of a task to be performed is a task with a completion location at the current location of the LAD. Support may be requested for local micro-directions and/or a micro-map (902). Micro-directions refer herein to directions within a location, for example directions within a business such as a store. A micro-map refers herein to a map of a particular location, for example a business such as a store. A request for support may be any inquiry to determine whether micro-directions and/or a micro-map are available. In some embodiments, a request may be transmitted via a network such as a wireless network, for example 802.11 or Bluetooth. In some embodiments, a request may be implicit. An example of an implicit request is not to send a request, but instead to passively receive transmitted information indicating what services are available. If micro-directions or a micro-map are not available (903), then location-based guidance for task fulfillment is not presented in this example (904). If micro-directions and/or a micro-map are available (903), then micro-directions and/or a micro-map are requested in this example to fulfill one or more local tasks (905). An example of requesting micro-directions and/or a micro-map is to transmit information about task(s) that are to be performed locally. An example of information about a task that is to be performed locally is to transmit a grocery list within a grocery store. In some embodiments, information about task(s) that are to be performed locally may be encrypted, for example using the public half of a public/private key pair, the public half of which may be transmitted by the local location, for example in response to a request for support of local micro-directions or a micro-map.

A micro-map and/or micro-directions may be received (906). An example of a micro-map is a detailed map of a particular location, for example a map of the inside of a grocery store with annotations indicating types of goods being sold in various areas. Another example of a micro-map is a map of the inside of a grocery store with the locations of items on a shopping list marked. An example of micro-directions is a list of the locations of items on a shopping list within a grocery store, for example a list organized in a good order for shopping, such as a sequential walk through the grocery store aisles containing items on the shopping list such that no aisle is traversed more than once. The micro-map and/or micro-directions may be displayed to the user (907), for example on the screen of a LAD. Another example of display of micro-directions is the use of distributed displays, such as lighting on shelves or at micro-intersections, which may provide information in response to a LAD's request for finer details in a given area. For example, a task such as "brown sugar" may have directed a shopper to a specific aisle, and either an explicit user input button such as "I still can't find it," or an implicit action such as the LAD transmitting a location in a suggested aisle, may cause a light to flash next to the "brown sugar" products.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method for associating tasks with a location, the method being performed by one or more processors and comprising:
identifying a task;
determining a completion location for where the task is to be completed by at least a first user;
wherein determining the completion location includes determining a location where a prior task that is similar or identical to the task that is current was completed, and determining that location to be the completion location for the task that is current;
monitoring a location of the first user;
detecting that the first user is at or near the completion location;
prompting the first user to perform the task when the user is at the completion location;
wherein identifying the task includes automatically specifying the task in response to one or more events; and
wherein automatically generating the task includes generating the task in response to a depletion event that is detected for a resource of a system of the user, and wherein the task specifies an activity to replenish the resource.

2. The method of claim 1, wherein identifying the task includes receiving input from a user that specifies the task.

3. The method of claim 1, further comprising determining the prior task that is similar or identical by:
determining a category of the task that is current; and
determining the prior task as also being of the category.

4. The method of claim 3, wherein determining a category of the task includes matching text in a description of the task against a predetermined pattern, wherein the predetermined pattern is characteristic of the category.

5. The method of claim 3, wherein determining a category of the task includes comparing a description of the task with a description of the prior task, the prior task being associated with the category.

6. The method of claim 3, wherein determining a category of the task includes using a text classifier.

7. The method of claim 6, wherein the text classifier is a Bayesian classifier.

8. The method of claim 1, wherein determining the completion location includes identifying the prior task, and identifying the location where a user entered input that represented completion of the prior task as being the completion location of the task that is current.

9. The method of claim 1, wherein monitoring a location of the first user includes receiving Global Positioning System data from a device that accompanies the user.

10. A computer-implemented method for associating tasks with a location, the method being performed by one or more processors and comprising:
identifying a task;
determining a completion location for where the task is to be completed by at least a first user;
wherein determining the completion location includes determining a location where a prior task that is similar or identical to the task that is current was completed, and determining that location to be the completion location for the task that is current;
monitoring a location of the first user;
detecting that the first user is at or near the completion location;
prompting the first user to perform the task when the user is at the completion location;

wherein identifying the task includes automatically specifying the task in response to one or more events; and wherein automatically generating the task includes generating the task in response to a failure event that is detected of a system of the user, and wherein the task specifies an activity to repair the system.

11. The method of claim 10, wherein identifying the task includes receiving input from a user that specifies the task.

12. The method of claim 10, further comprising determining the prior task that is similar or identical by:

determining a category of the task that is current; and determining the prior task as also being of the category.

13. The method of claim 12 wherein determining a category of the task includes matching text in a description of the task against a predetermined pattern, wherein the predetermined pattern is characteristic of the category.

14. The method of claim 12, wherein determining a category of the task includes comparing a description of the task with a description of the prior task, the prior task being associated with the category.

15. The method of claim 12, wherein determining a category of the task includes using a text classifier.

16. The method of claim 15, wherein the text classifier is a Bayesian classifier.

17. The method of claim 10, wherein determining the completion location includes identifying the prior task, and identifying the location where a user entered input that represented completion of the prior task as being the completion location of the task that is current.

18. The method of claim 10, wherein monitoring a location of the first user includes receiving Global Positioning System data from a device that accompanies the user.

* * * * *